May 17, 1960
S. A. DENMAN ET AL
2,936,647
GOVERNOR CONTROL HEAD
Filed July 15, 1957
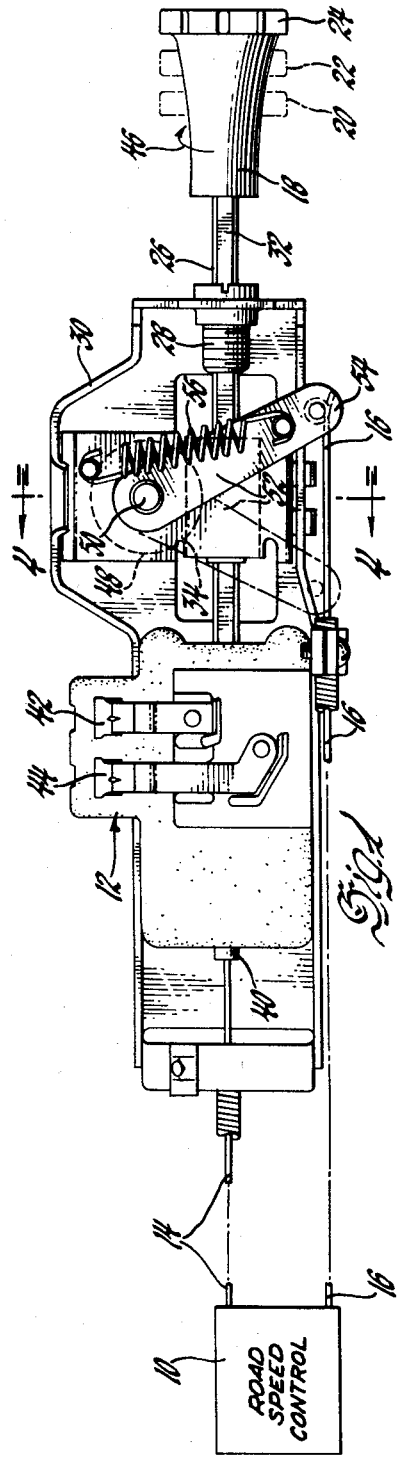
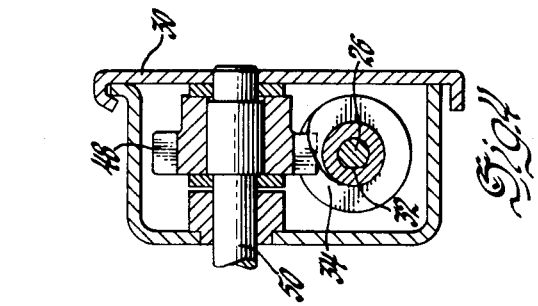
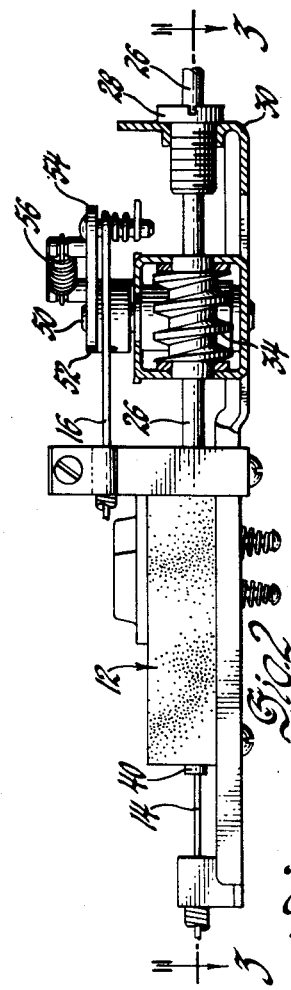
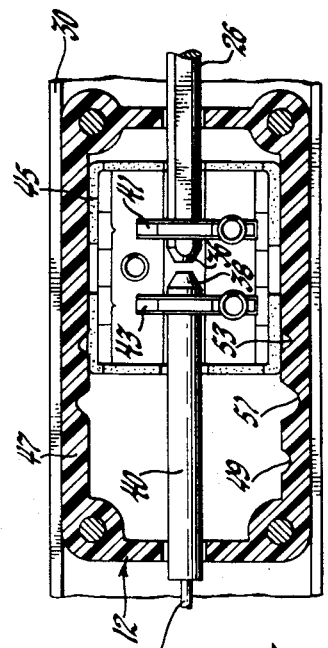
INVENTORS
Stephen A. Denman &
Gerald D. Hawthorne
BY
L. D. Bush
ATTORNEY

2,936,647

GOVERNOR CONTROL HEAD

Stephen A. Denman, Piqua, and Gerald D. Hawthorne, Troy, Ohio, assignors to General Motors Corporation, Detroit, Mich., a corporation of Delaware Application July 15, 1957, Serial No. 671,808

1 Claim. (Cl. 74—471)

The invention relates to the control head for a road speed control mechanism and more particularly to a control head which constitutes a speed adjustment and switch assembly. While the control head may be used with other mechanisms, it is particularly useful in a road speed control system such as that disclosed and claimed in the co-pending application Serial No. 665,091, filed June 11, 1957. When used in such a system, a road speed control is provided which will operate to give either normal vehicle operation, a maximum vehicle speed governor operation or an automatic cruise operation which comprises a maximum vehicle speed governing condition in combination with an automatic speed maintaining cruise condition when the selected speed has been attained by the vehicle.

The control head provides a single knob control and adjustment mechanism for such a road speed control system. It may be set at any one of several selecting positions by a push-pull action and may be adjusted to a desired speed by a rotating action. The push-pull portion of the operation controls a cable leading to the road speed control mechanism and may adjust that mechanism in any desired manner such as adjusting the position of a road speed control pilot valve. When the control head knob is rotated, a second cable may be controlled to change the tension on a road speed control spring. The control head thus provides a simplified system for control for an automatic cruise type road speed mechanism.

In the drawing:

Figure 1 is a plan view of a control head embodying the invention;

Figure 2 is a view in elevation of the control head of Figure 1 with parts broken away and in section;

Figure 3 is a cross section view of a portion of the control head of Figure 1 taken in the direction of the arrows 3—3 on Figure 2, and Figure 4 is a cross section view of a portion of the control head of Figure 1 taken in the direction of arrows 4—4 on that figure.

The automatic road speed control mechanism 10 may be controlled and adjusted by control head 12 and is connected therewith through push-pull cables 14 and 16. Cable 14 may control a desired portion of road speed control 10 such as a hydraulic control pilot valve and may be hydraulically biased in a direction toward the control head 12 from road speed control 10. Cable 16 may control the tension on a road speed control spring in the road speed control mechanism 10 and is also preferably biased in a direction toward the control head 12 from road speed control 10.

A control knob 18 may be provided for manual control and may have any of several desired control positions which may include the road speed control "off" position 20, the road speed control "governor on" position 22 and the road speed control "automatic cruise" position 24. Knob 18 is preferably axially and non-rotatably secured to rod 26. This rod extends into control head 12 and passes through a guide bushing 28 in one end of the control head frame. Rod 26 is preferably provided with a flat side 32 and passes through a worm gear 34 which is mounted for co-axial rotation about and with rod 26. Rod 26 terminates at end 36 adjacent the end 38 of rod 40. Cable 14 is secured to rod 40 and is moved axially with that rod. The ends 36 and 38 of rods 26 and 40 are received by spring retaining members 41 and 43. These members are secured within sliding member 45 and act to fix rods 26 and 40 to member 45. Member 45 is slidable in a non-conducting case 47 and is provided with a spring biased detent which engages notches 49, 51, and 53 to position rods 26 and 40 for the governor "off," governor "on," and "automatic cruise" positions respectively.

A pair of electrical switch contacts 42 and 44 are mounted on case 47 and may be engaged by a movable electrical contact on member 45. These contacts are connected in a holding solenoid circuit which holds the road speed control linkage in a predetermined position for keeping a constant vehicle road speed.

When control knob 18 is moved to the road speed control "off" position 20, rod 26 acts through sliding member 45 to move rod 40, moving push-pull cable 14. The control pilot valve in road speed mechanism 10 is then moved to an off position and contacts 42 and 44 are disconnected, rendering the road speed control 10 inoperative. With the control in this position, the driver has available normal operation of the vehicle. There is no vehicle speed under this condition to which the vehicle is governed or at which the vehicle will be automatically maintained.

When the control knob 18 is moved to the "on" position 22, rod 26 moves rod 40 to the right and may be aided by the biasing force within the road speed mechanism which is constantly exerted on cable 14. The hydraulic pilot valve, or its equivalent, in road speed control 10 is then positioned to permit the road speed control mechanism to provide a governed maximum vehicle speed.

When control knob 18 is moved to the "automatic cruise" position 24, as is illustrated in the drawings, the contacts 42 and 44 are connected and the holding solenoid is energized. In this position the operator is provided with a governor regulated maximum vehicle speed and with an automatic cruise condition at that speed.

The governed vehicle and automatic cruise speed is selected by rotating control knob 18. When it is rotated clockwise as viewed by the operator, i.e. in the direction of the arrow 46, rod 26 is rotated clockwise, driving worm gear 34 in the same direction. Gear 48 is enmeshed with worm gear 34 and is driven thereby. When gear 48 is rotated, the shaft 50 on which the gear is mounted is also rotated. Shaft 50 extends upwardly above the frame 30 of the control head and terminates at lever 52. Lever 52 is mounted, as is best shown in Figure 1, to be oscillated when shaft 50 is rotated. The rotary movement of control knob 18 is therefore translated into an oscillatory movement of lever 52. The end 54 of lever 52 is secured to the end of push-pull cable 16 so that cable 16 is moved back and forth with the oscillating movement of lever 52. Movement of cable 16 may adjust the force on the governor speed control spring, changing the speed at which the road speed control mechanism 10 operates to establish maximum vehicle speed and/or automatic cruise speed. Over-center spring 56 may be provided on lever 52 in order to reduce the torque required to turn knob 18.

A road speed control head which provides a speed adjustment and switch assembly has thus been disclosed which controls energization of the road speed control mechanism and permits operation of that mechanism either as a road speed governor or as an automatic cruise control. The entire control may be operated with a single knob.

In an adjustable control for a pair of push-pull cables a control frame, a single control input member mounted thereon, means for independently controlling one of said cables by axial movement of said input member, and means for independently controlling the other of said cables by rotary movement of said input member including a worm gear on said input member responsive only to rotary movement of said input member, a shaft askew of said input and having a pinion gear secured thereto in mesh with said worm gear, a lever mounted on said shaft for oscillating rotation therewith and having said other cable attached to one end whereby linear movement is imparted thereto in increments in proportion to rotary movement of said input member, said lever having an overcenter spring secured thereto intermediate said shaft and said one end and also secured to said frame.

References Cited in the file of this patent

UNITED STATES PATENTS

| | | |
|---|---|---|
| 1,020,889 | Daehler | Mar. 19, 1912 |
| 1,101,692 | Goodsped | June 30, 1914 |
| 1,263,750 | Dolan | Apr. 23, 1918 |
| 2,533,392 | Nelson | Dec. 12, 1950 |
| 2,716,874 | Wiley | Sept. 6, 1955 |
| 2,781,425 | Glowzinski et al. | Feb. 12, 1957 |